(12) United States Patent
Fernandez (10) Patent No.: US 11,527,876 B2
(45) Date of Patent: Dec. 13, 2022

(54) PLUGGABLE ELECTRICAL OUTLET SYSTEM

(71) Applicant: Claudio A. Fernandez, Corona, NY (US)

(72) Inventor: Claudio A. Fernandez, Corona, NY (US)

(73) Assignee: Claudio A. Fernandez, Corona, NY (US)

( * ) Notice: Subject to any disclaimer, the term of this patent is extended or adjusted under 35 U.S.C. 154(b) by 3 days.

(21) Appl. No.: 17/165,195

(22) Filed: Feb. 2, 2021

(65) Prior Publication Data

US 2021/0344182 A1 Nov. 4, 2021

Related U.S. Application Data (60) Provisional application No. 62/942,233, filed on Dec. 2, 2019.

(51) Int. Cl.

| H02G 3/18 | (2006.01) |
|---|---|
| H01R 24/68 | (2011.01) |
| H01R 33/72 | (2006.01) |
| H01R 24/76 | (2011.01) |
| H01R 25/00 | (2006.01) |
| H01R 31/06 | (2006.01) |
| H01R 105/00 | (2006.01) |
| H01R 103/00 | (2006.01) |

(52) U.S. Cl.
CPC ............... *H02G 3/18* (2013.01); *H01R 24/68* (2013.01); *H01R 24/76* (2013.01); *H01R 31/06* (2013.01); *H01R 33/72* (2013.01); *H01R 25/006* (2013.01); *H01R 2103/00* (2013.01); *H01R 2105/00* (2013.01)

(58) Field of Classification Search
CPC . H02G 3/18; H02G 3/16; H01R 24/68; H01R 24/76; H01R 31/06; H01R 33/72; H01R 2105/00; H01R 24/86; H01R 2103/00; H01R 25/006
See application file for complete search history.

(56) References Cited

U.S. PATENT DOCUMENTS

| 5,383,799 | A | 1/1995 | Fladung | |
|---|---|---|---|---|
| 6,945,815 | B1* | 9/2005 | Mullally | H01R 13/6215 439/535 |
| 7,830,248 | B2 | 11/2010 | Logvinov et al. | |
| 8,105,107 | B2* | 1/2012 | Gorman | H01R 4/64 439/535 |
| 8,415,561 | B2* | 4/2013 | Gates | H01R 13/748 174/59 |
| 9,748,715 | B2* | 8/2017 | Wang | H01R 31/005 |
| 10,680,395 | B2* | 6/2020 | Chadwell | H02G 3/081 |

(Continued)

*Primary Examiner* — Michael C Zarroli
(74) *Attorney, Agent, or Firm* — Polsinelli LLP (57) ABSTRACT

Pluggable electrical outlet system is provided including a recessed wall box which may interchangeably receive various mating sockets to provide a universal outlet system. The pluggable electrical outlet system further includes a junction box for distributing power lines, a circuit break box with universal connectors, and extenders. The extenders are configured to run power from the circuit breaker and the junction boxes to the recessed wall boxes. The recessed wall box comprises a female connector structured to interchangeably receive a male connector located on each of the series of sockets.

19 Claims, 12 Drawing Sheets

(56) References Cited

U.S. PATENT DOCUMENTS

| | | | |
|---|---|---|---|
| 10,720,764 B2* | 7/2020 | Misener | H01R 13/665 |
| 2003/0190838 A1* | 10/2003 | Magyar | H02G 3/121 |
| | | | 439/535 |
| 2007/0209818 A1* | 9/2007 | Forrest | H02G 3/16 |
| | | | 174/50 |
| 2019/0008575 A1* | 1/2019 | Holub | H01R 9/05 |
| 2019/0379154 A1* | 12/2019 | Nishijima | H01R 13/512 |
| 2021/0104855 A1* | 4/2021 | Bayard | H01R 13/518 |

* cited by examiner

PLUGGABLE ELECTRICAL OUTLET SYSTEM

CROSS-REFERENCE TO RELATED APPLICATIONS

This application claims priority to 62/942,233, filed on Dec. 2, 2019. This application entirely incorporated application 62/942,233 by this reference.

FIELD OF THE INVENTION

The present invention generally relates to electrical systems and, more specifically, relates to electrical outlets.

BACKGROUND

The following includes information that may be useful in understanding the present disclosure. It is not an admission that any of the provided information is prior art or material to the presently described or claimed inventions or that any publication or document specifically or implicitly referenced is prior art.

In many applications found in both the home and the office, it is necessary to use plug adaptors to enable a user to connect more than two electrical plugs to a standard duplex electrical outlet. These types of adapters typically engage one or both of the receptacles in a standard electrical outlet. Since the typical outlet is usually surface mounted and substantially flush with the wall or other surface on which it is mounted, any electrical plugs inserted into the outlets, as well as multiple plug adaptors, must extend out from the wall. Using plug adapters usually results in a multiple plug arrangement that is bulky and occupies considerable volume around the outlet, making it difficult to place furniture, equipment, or other objects near the outlet. Also, the accompanying jumble of multiple electrical cords extending from the same outlet is not safe. A suitable solution is desired.

Various attempts have been made to solve problems found in electrical outlet art. Among these are found in U.S. Pat. Nos. 5,383,799; 5,383,799; and 7,830,248. This prior art is representative of electrical outlets.

SUMMARY

Given the disadvantages inherent in the known art, this disclosure provides

The present invention advantageously fills the gap created by the problems described above by providing a universal pluggable method. The present invention is superior to other systems in that it effectively improves household wiring with a safer method.

A pluggable electrical outlet system is disclosed. The system comprises a recessed wall box configured to accept one of a series of sockets to provide a universal power outlet system. The pluggable electrical outlet system further includes a junction box for distributing power lines, a circuit breaker box with universal connectors, and extenders. The extenders are configured to run power from the circuit breaker and the junction boxes to the recessed wall boxes. The recessed wall box comprises a female connector structured to receive interchangeably a male connector located on each socket series. The pluggable electrical outlet system allows homeowners to customize and update outlets throughout a home or other building in which the system is installed.

In summarizing this device, certain aspects and advantages have been described. The new device or method may be made or carried out to achieve or optimize one set of advantages without necessarily achieving other advantages.

BRIEF DESCRIPTION OF THE DRAWINGS

The figures that accompany the written portion of this specification illustrate variations and methods of use for the present devices.

The figures illustrate various pluggable electrical outlet systems.

DETAILED DESCRIPTION 100 modular insert (MI)
110 face
120 usb port
130 flange
140 modular switch
150 dimmer
200 MI back
205 modular wall box
203 outer surface
210 E contact
212 R contact
214 E face
216 R face
220 EE connector
224 ER connector
228 RR connector
230 RE connector
240 clip
250 groove
410 connector body
420 outer cover
430 threads
610 wire inserts
910 modular junction box (JB)
920 JB back
930 mount Unless defined otherwise, all technical and scientific terms used in this document have the same meanings as commonly understood by one skilled in the art to which the disclosed invention pertains. Singular forms—a, an, and the—include plural referents unless the context indicates otherwise. Thus, a reference to "fluid" refers to one or more fluids, such as two or more fluids, three or more fluids, etc. When an aspect is said to include a list of components, the list is representative. If the component choice is specifically limited to the list, the disclosure will say so. Moreover, listing components acknowledges that exemplars exist for each component and any combination of the components—including combinations that exclude any one or any combination of the listed components. For example, "component A is chosen from A, B, or C" discloses exemplars with A, B, C, AB, AC, BC, and ABC. It also discloses (AB but not C), (AC but not B), and (BC but not A) as exemplars, for example. Combinations that one of ordinary skill in the art knows to be incompatible with each other or with the components' function in this device are excluded from this device, in some exemplars.

When an element or layer is referred to as being "on", "engaged to", "connected to" or "coupled to" another element or layer, it may be directly on, engaged, connected, or coupled to the other element or layer, or intervening elements or layers may be present. In contrast, when an element is referred to as being "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.).

Although the terms first, second, third, etc. may describe various elements, components, regions, layers, or sections, these elements, components, regions, layers, or sections should not be limited by these terms. These terms may only distinguish one element, component, region, layer, or section from another region, layer, or section. Terms such as "first", "second", and other numerical terms do not imply a sequence or order unless indicated by the context. Thus, a first element, component, region, layer, or section discussed below could be termed a second element, component, region, layer, or section without departing from this disclosure.

Spatially relative terms, such as "inner", "outer", "beneath", "below", "lower", "above", "upper" and the like, may be used for ease of description to describe one element or feature's relationship to another element or feature as illustrated in the figures. Spatially relative terms may be intended to encompass different orientations of the device in use or operation and the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors interpreted accordingly.

The description of the exemplars has been provided for purposes of illustration and description. It is not intended to be exhaustive or to limit the invention. Individual elements or features of a particular exemplar are generally not limited to that exemplar but, where applicable, are interchangeable and can be used in a selected exemplar, even if not explicitly shown or described. The same may also be varied in many ways. Such variations are not a departure from the invention, and all such modifications are included within the invention's scope.

For purposes of this disclosure, an EE connector is a connector having an extending (E) face 214 and having an extending (E) contact 210. See FIG. 2A, element 220. For purposes of this disclosure, an ER connector is a connector having an E face 214 and having an R contact 212. See FIG. 2B, element 260. For purposes of this disclosure, an RR connecter is a connector having an R face 216 and having an R contact 212. An RE connector is a connector having an R face 216 and an E contact 210.

The present invention is directed to a pluggable electrical outlet system.

In one embodiment of the present invention, pluggable electrical outlet system may comprise a recessed wall box configured to accept one of a series of sockets. The system is designed to replace typical house wiring with a safer method and create a universal pluggable method. Once the system is installed inside walls and/or attic by an electrician, the wall boxes are ready to accept various types of switches.

Figure 1A:
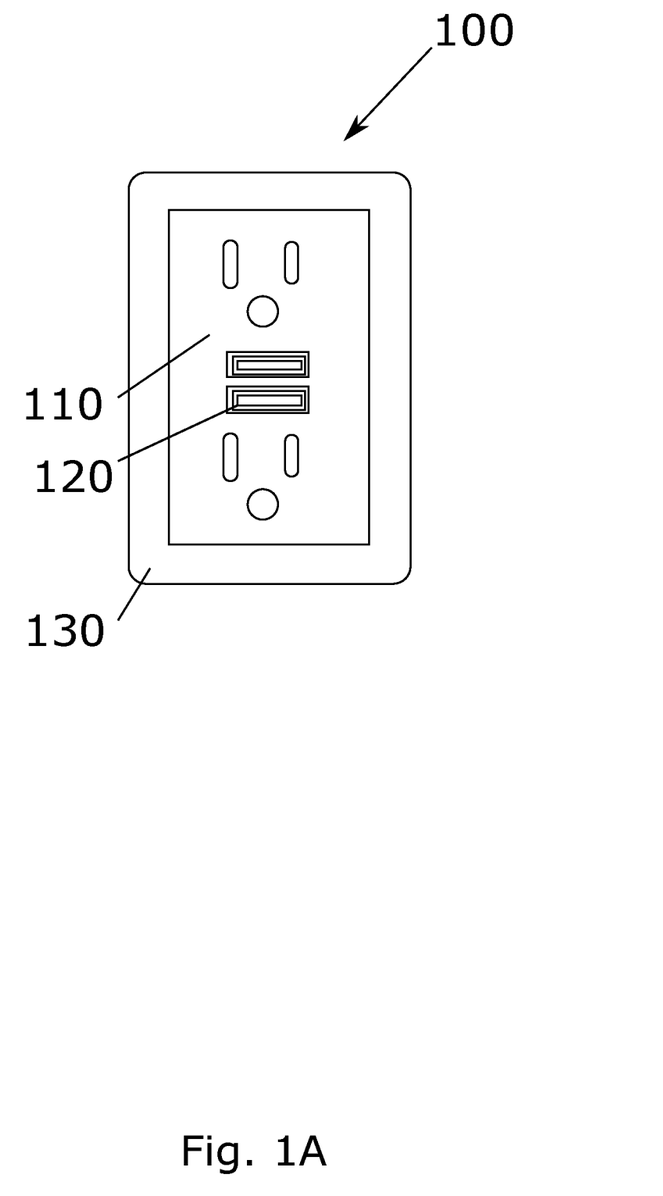
FIG. 1A is a front view of a pluggable electrical outlet system having an outlet arrangement.
Figure 1B:
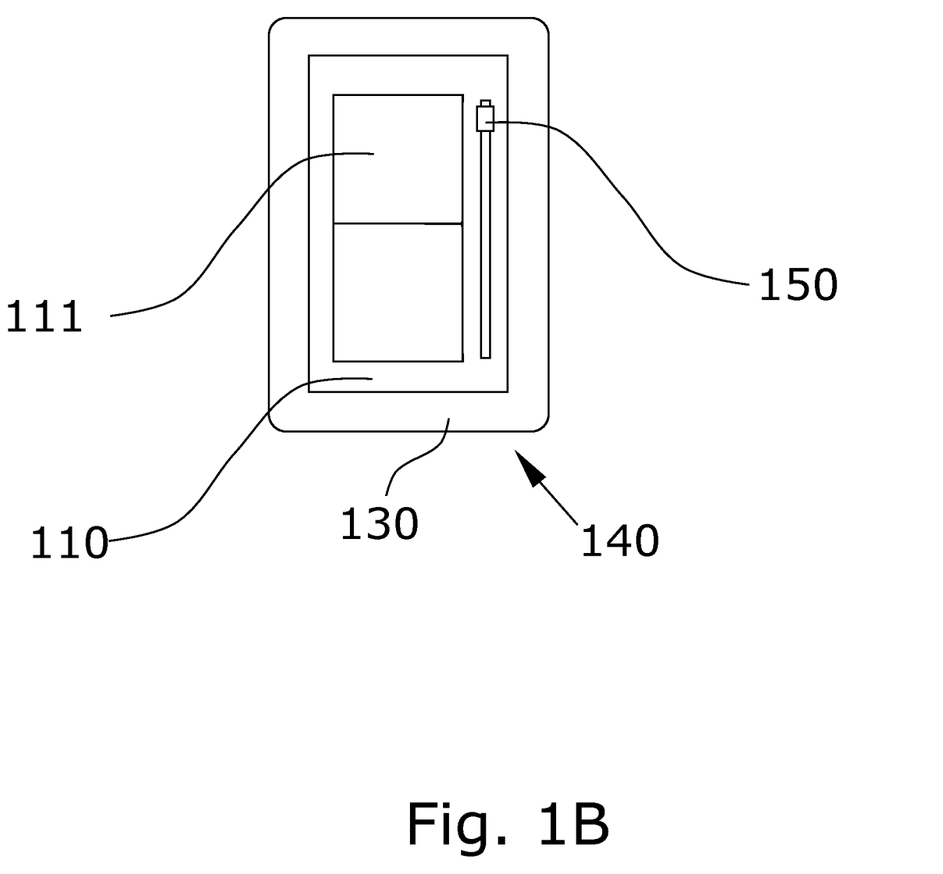
FIG. 1B is a front view of a pluggable electrical outlet system having a switch arrangement.

Referring now to the drawings, FIG. 1A shows a modular insert 100 of a modular or pluggable electrical outlet system. Modular insert 100 has face 110 and USB port 120. A modular insert 100 can be constructed with a variety of faces and ports. FIG. 1A also shows flange 130. FIG. 1B shows an alternative module or insert 140 in which face 110 is a switch plate having switch surfaces 111 and dimmer 150.

Figure 2A:
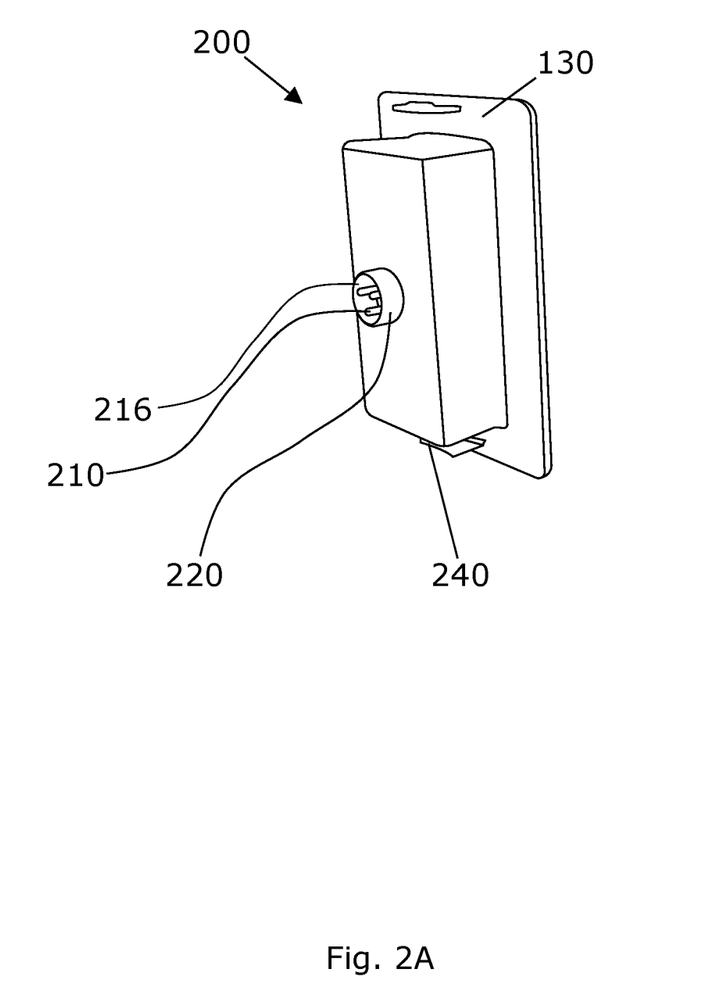
FIG. 2A is a back perspective view of a modular insert of a pluggable electrical outlet system.
Figure 2B:
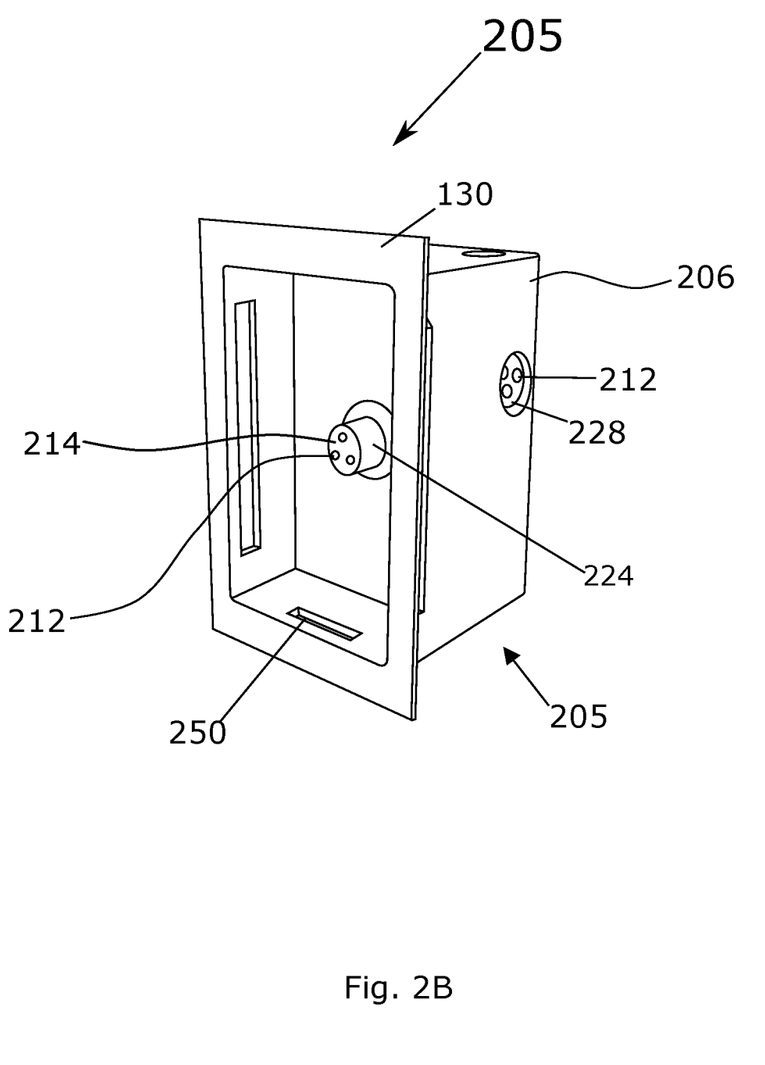
FIG. 2B is a front perspective view of a modular wall box of a pluggable electrical outlet system.

FIG. 2A depicts modular insert 100 seen from the backside 200. This version has EE connector 220. Modular insert 100 also contains clip 240. FIG. 2B depicts module or wall box 205. FIG. 2B comprises groove 250 for receiving clip 240. The insert 100 may include plastic pins or clips that secure the socket into the wall box 205. Clip 240 and groove 254 work together to mechanically connect these components. The recessed wall box comprises notches for receiving and securing the plastic pins of the sockets such that the socket is mounted to the recessed wall box. Modular wall box 205 has ER connector 220 extending from a central region inside of modular insert 100. Also on outer surface 206, modular wall box 205 has RR connector 228, which has R face 216 and R contacts 212 positioned as shown.

Figure 2C:
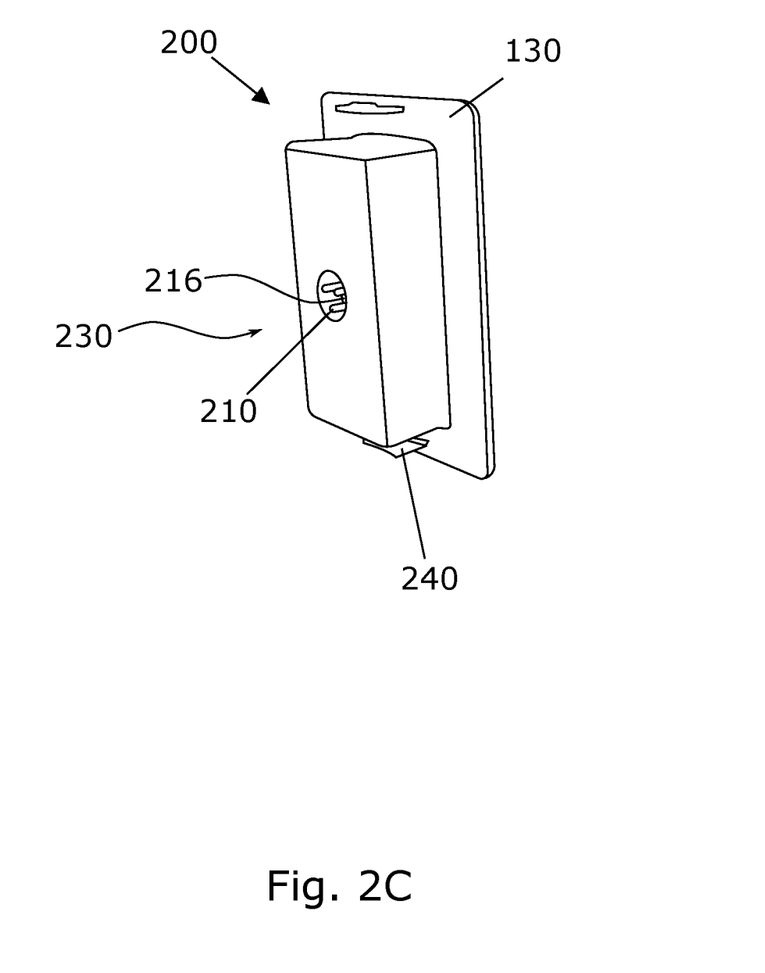
FIG. 2C is a back perspective view of another modular insert of a pluggable electrical outlet system.

FIG. 2C shows an alternative version of modular insert 100 which has an RE connector 230.

Modular wall box 205 may interchangeably receive various mating sockets to provide a universal outlet system. A front view of a standard outlet with USB and a front view of a standard dimmer are shown in FIG. 1A and FIG. 1B. Homeowners may exchange or customize various outlets, dimmers, sound controllers, intercoms, and the like using the pluggable electrical outlet system.

Figure 3:
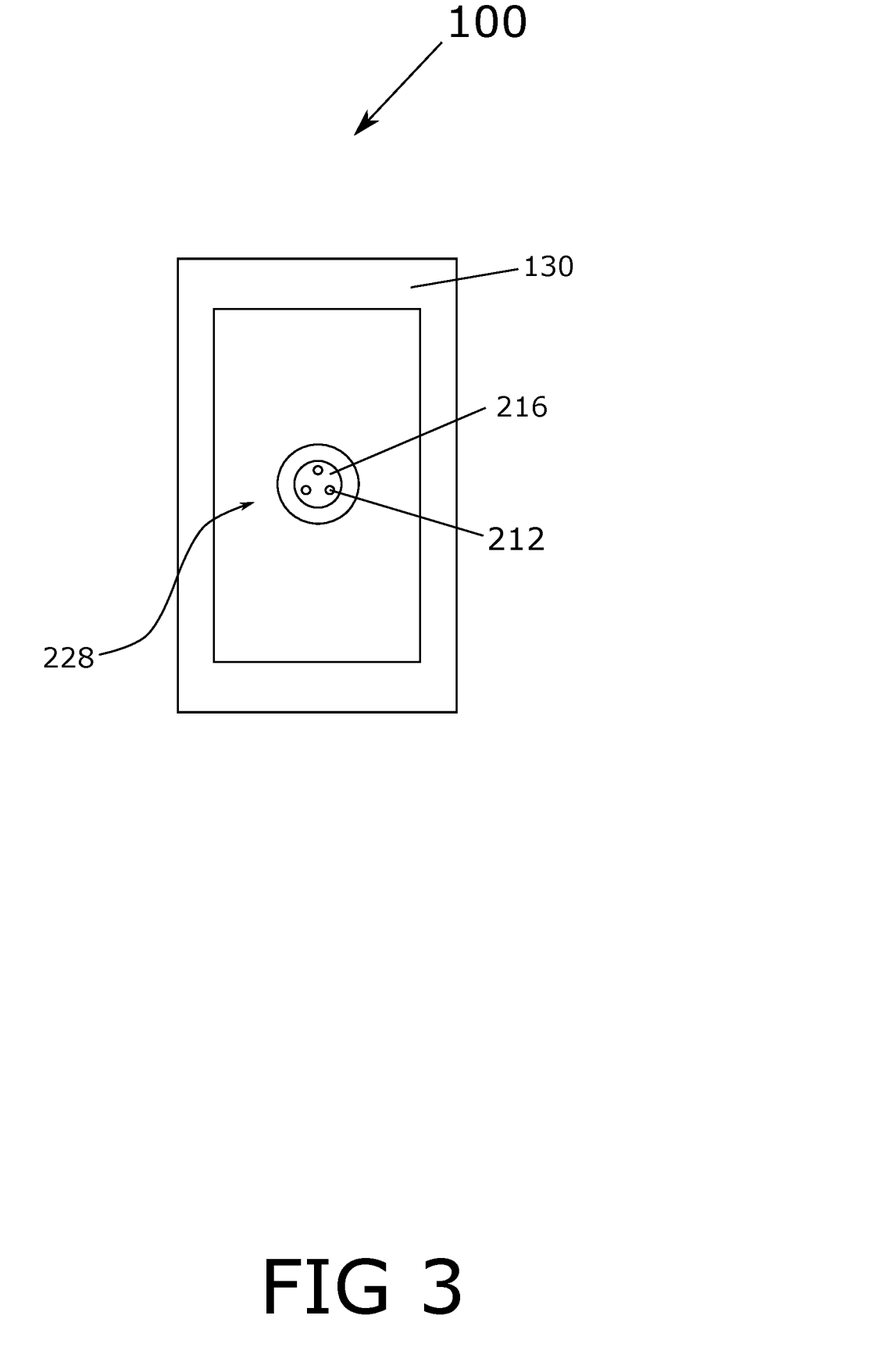
FIG. 3 is an elevation view illustrating a pluggable electrical outlet system.

Referring now to FIG. 3 showing an elevation view of wall box 205 of the pluggable electrical outlet system. The recessed wall box is provided to receive and accept a mating socket such as a dimmer or USB outlet. In some versions, modular inserts comprise one or more of EE connector 220, ER connector 224, RR connector 228, and RE connector 230. These connector socket comprises various versions of a multi-prong connector. For instance, E contacts 210 interact with R contacts 212. In some versions, the number of connectors is 2, 3, or more.

Figure 4:
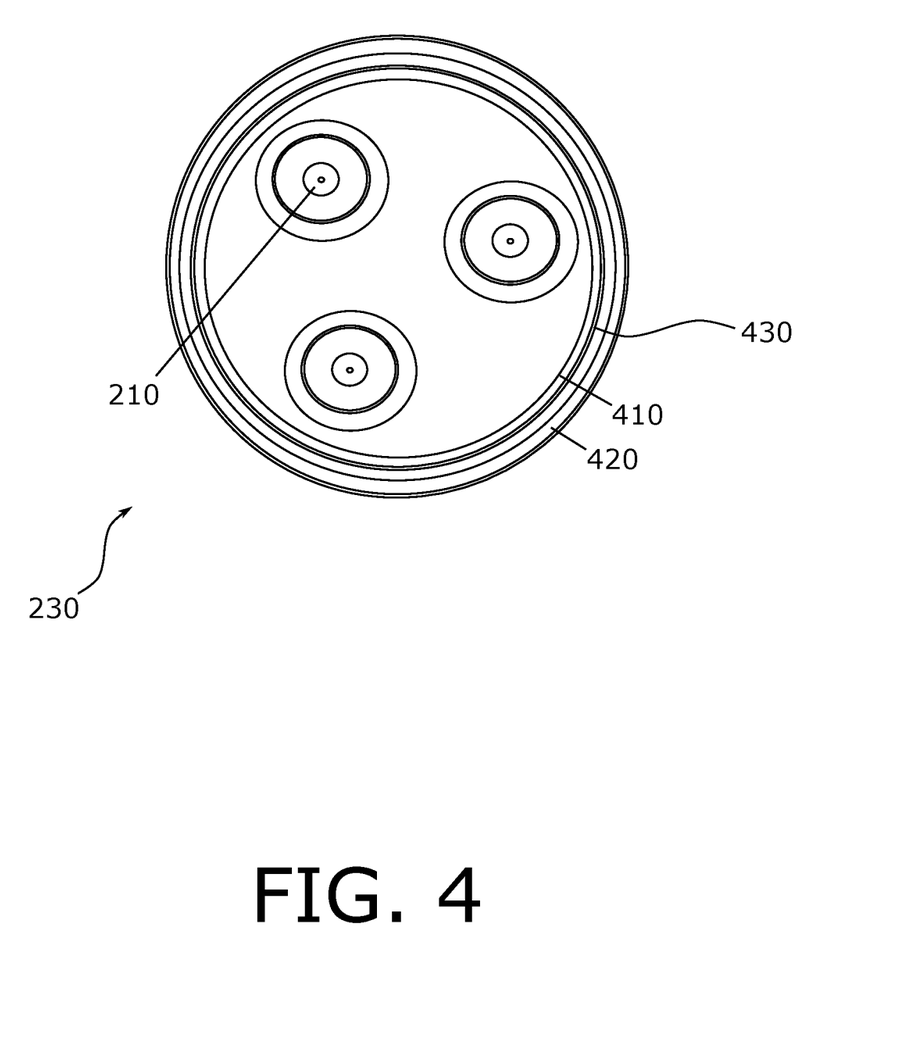
FIG. 4 is a cross-section view illustrating a connector used in the pluggable electrical outlet system.

FIG. 4 shows a cross sectional view cutting through E contacts 210 of RE connector 230. This reveals the cross-section of connector body 410, threads 430, and outer cover 420.

Figure 5:
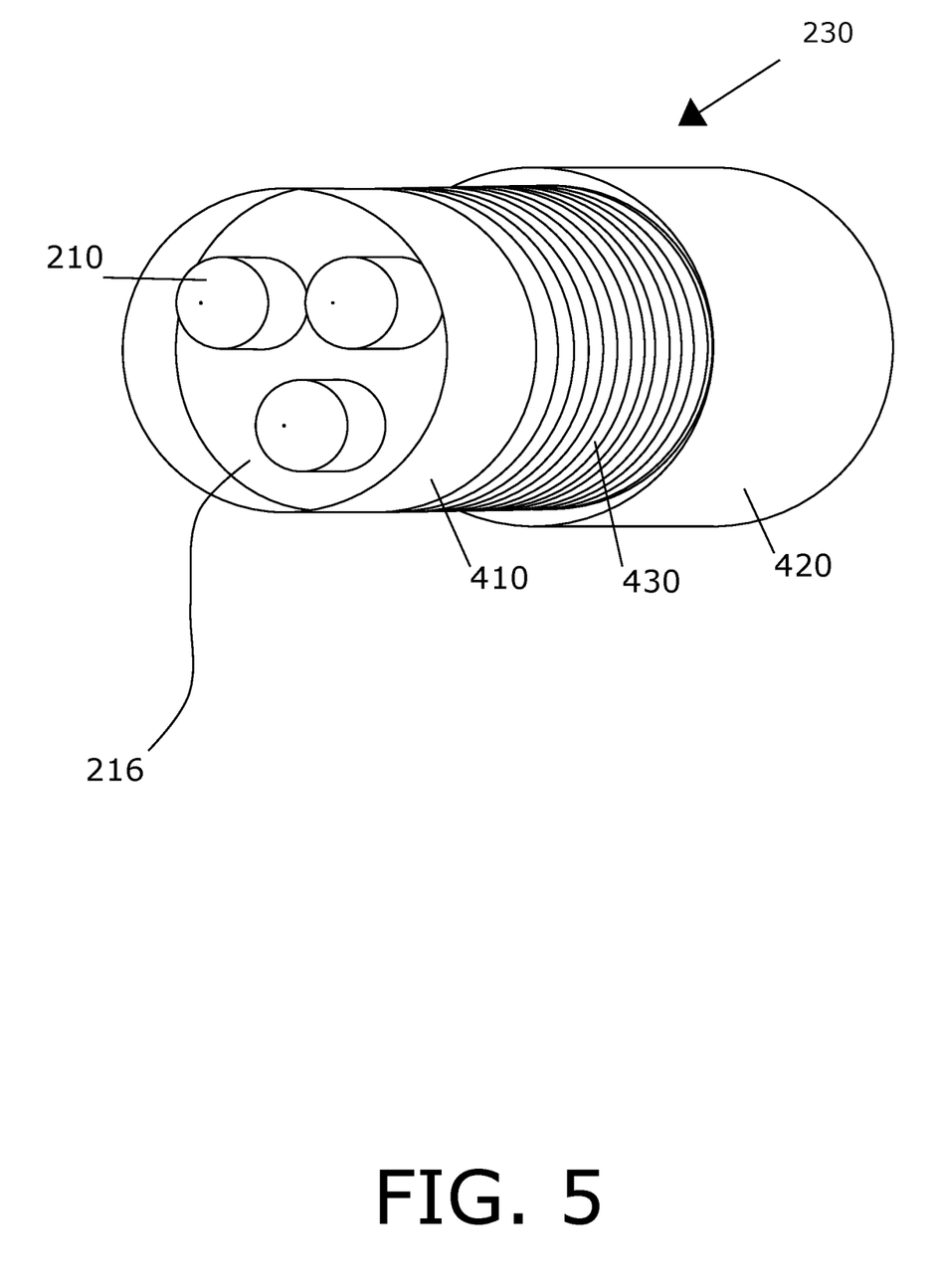
FIG. 5 is a perspective view illustrating the connector of FIG. 4.

FIG. 5 shows a perspective view of RE connector 230 depicted in FIG. 4. E contact 210 extends from R face 216.

Figure 6:
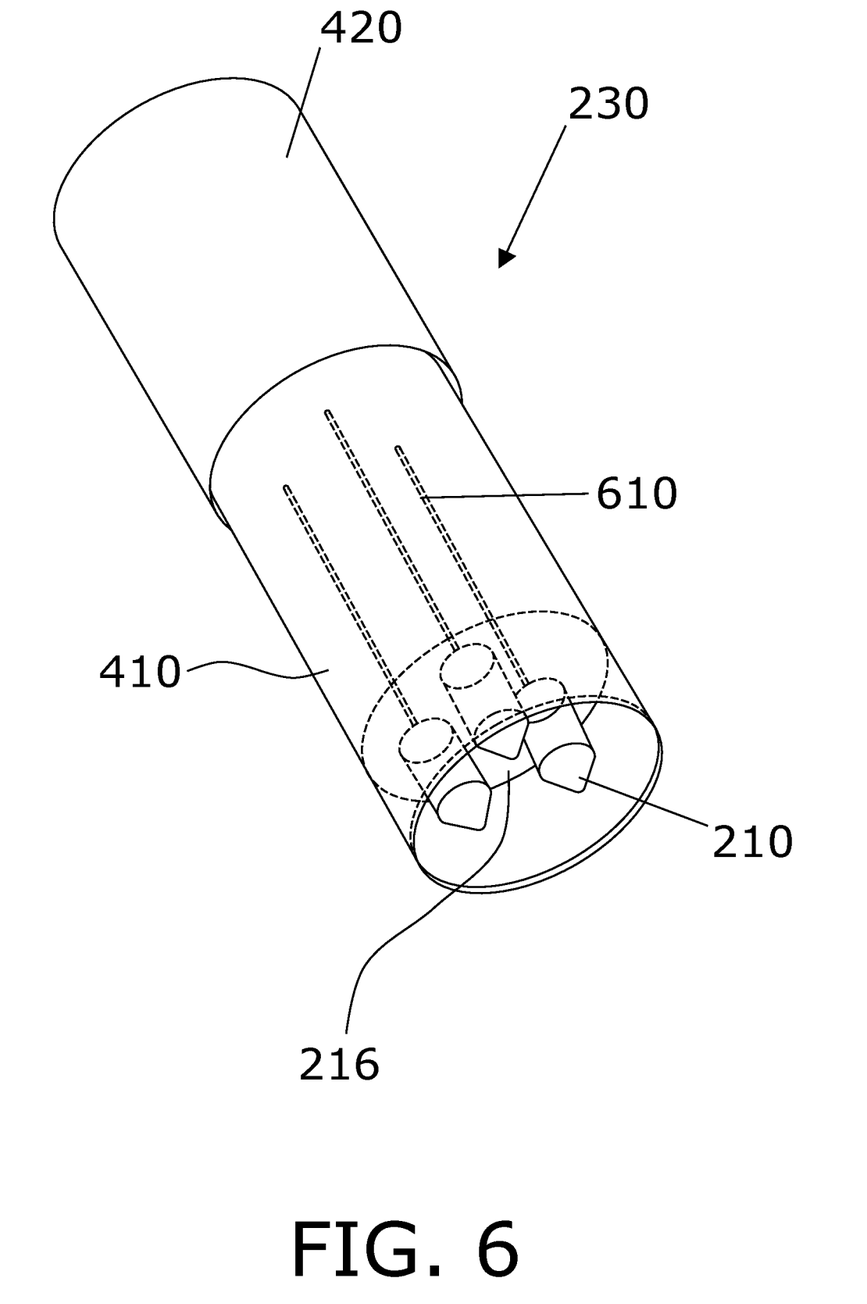
FIG. 6 is another perspective view illustrating the connector of FIG. 4.

FIG. 6 shows an alternative perspective view of the RE connector depicted in FIG. 4. In this depiction wire inserts 610 are shown inside of connector body 410. These passageways ultimately allow wires to connect to E contacts 210 to engage in electrical connections with house wiring or in a make-and-break fashion with other connectors.

Figure 7:
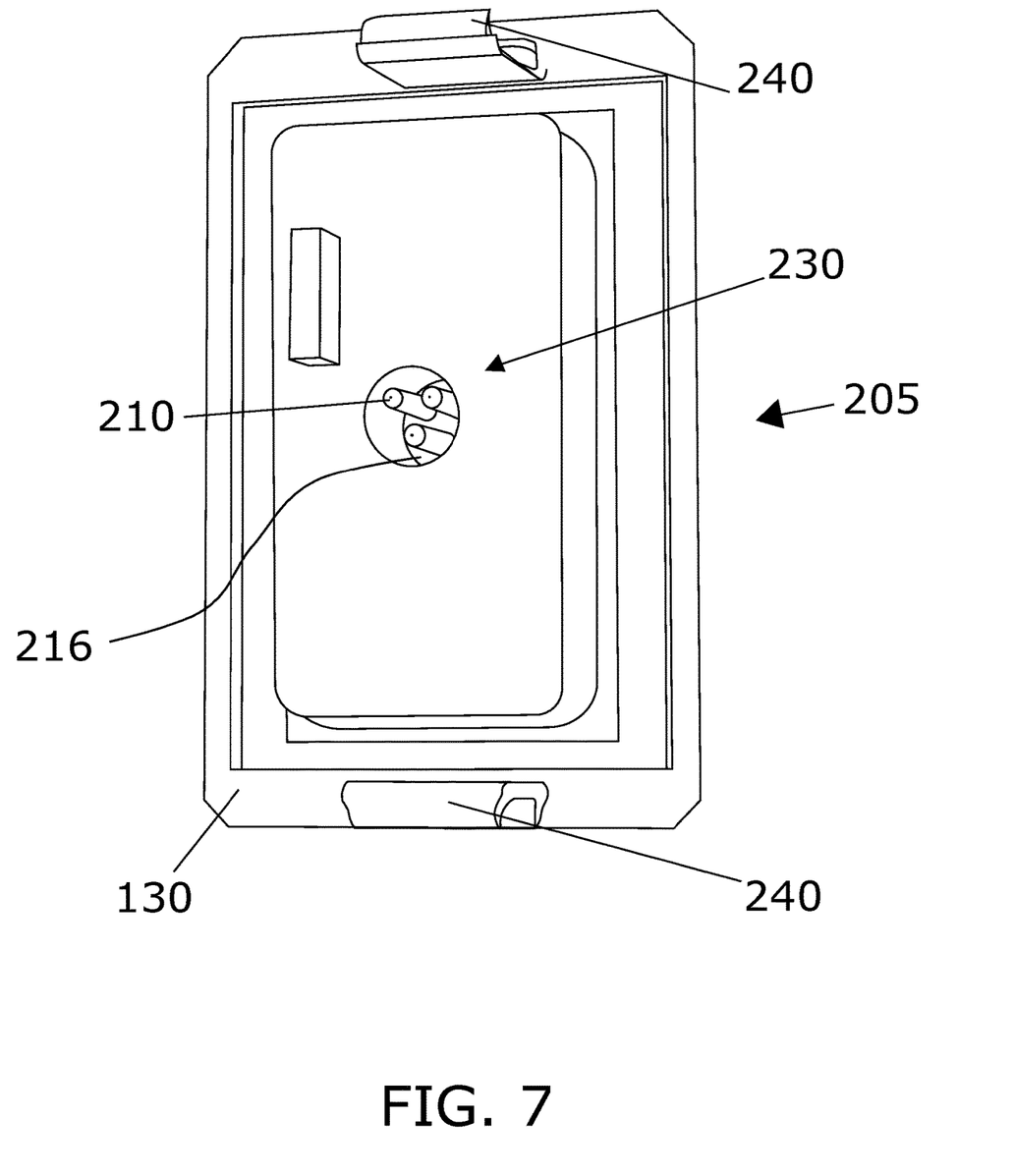
FIG. 7 is a back perspective view of a modular insert of a pluggable electrical outlet system.

FIG. 7 shows a back perspective view of a modular insert 100. This depiction shows another view of RE connector 230 with E contacts 210 and R face 216.

Figure 8A:
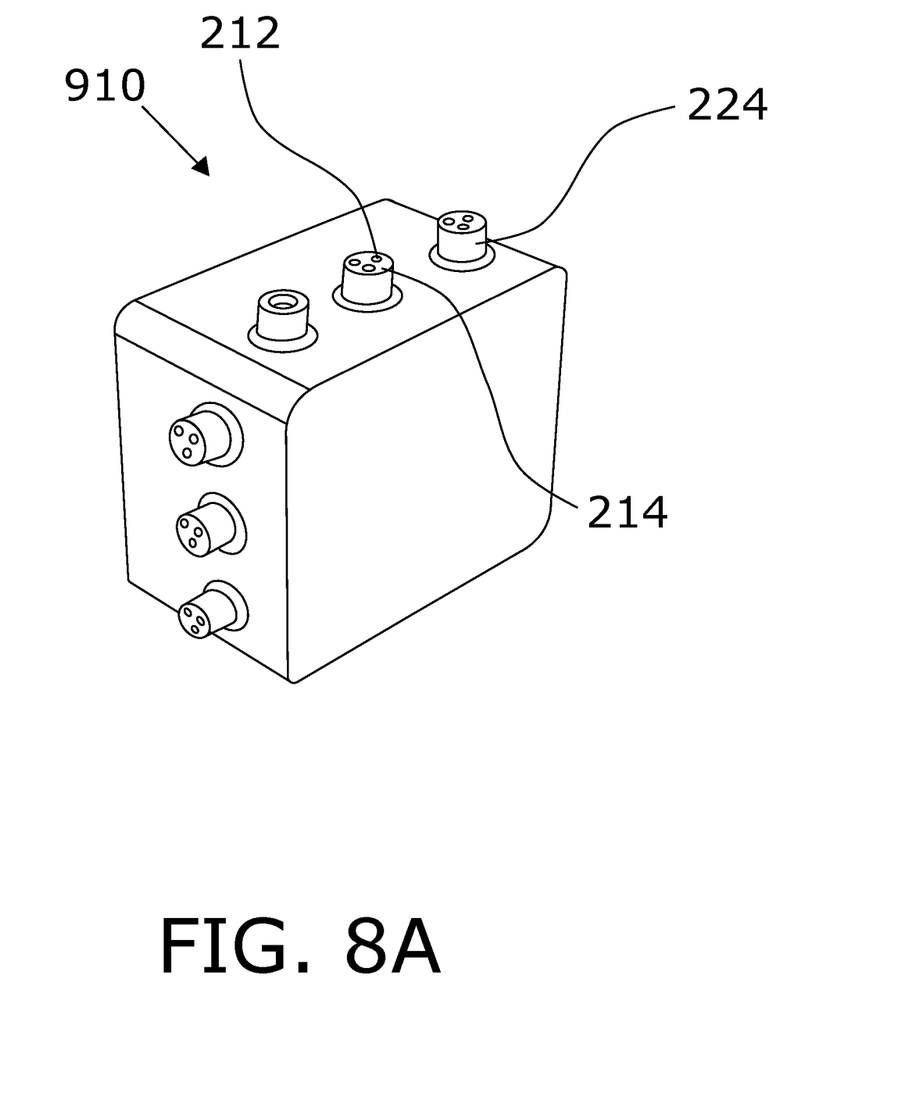
FIG. 8A is a perspective view of a junction box of a pluggable electrical outlet system.
Figure 8B:
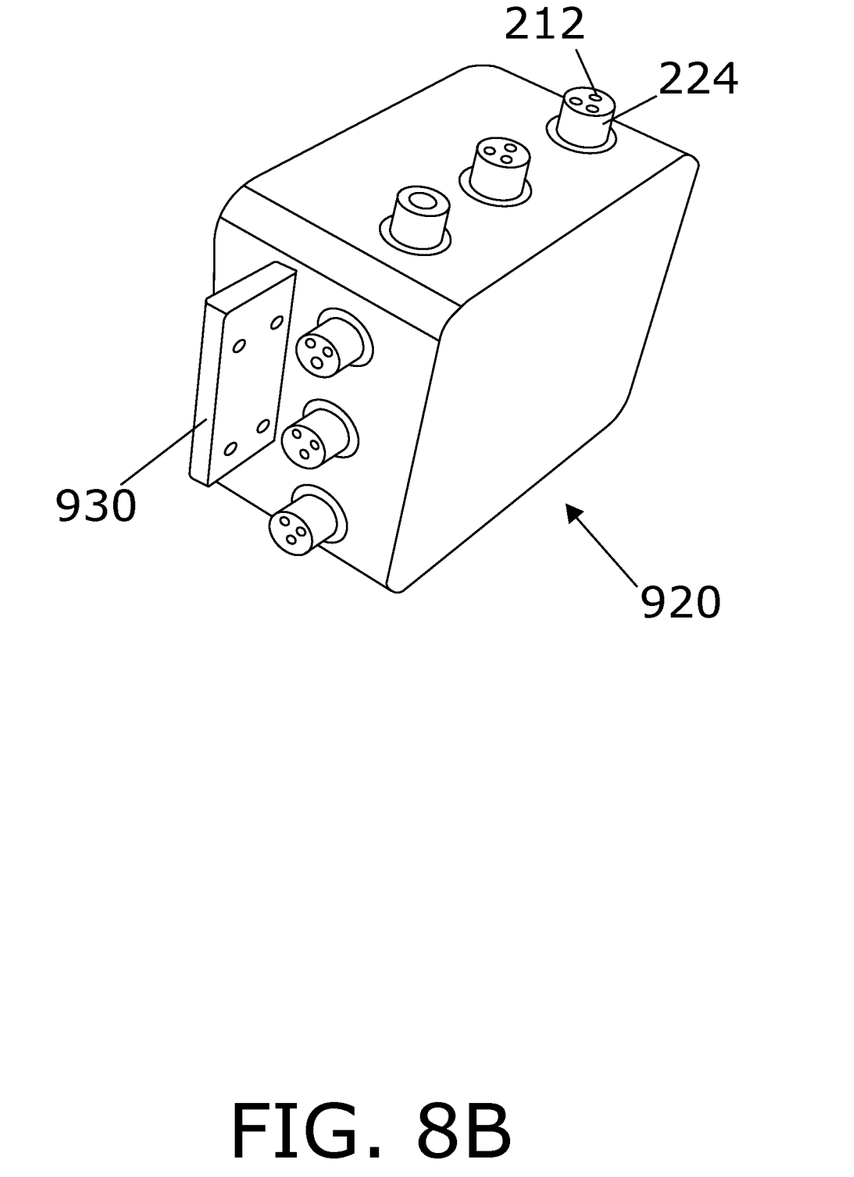
FIG. 8B is another perspective view of a junction box of a pluggable electrical outlet system.

FIGS. 8A and 8B show junction box 910 versions of the disclosed modular system. FIG. 8A depicts ER connectors 224 having R contacts 212 and E face 214. FIG. 8B shows a slightly different version of junction box 910. In this case, box 910 contains mount 930. This type of mount is sometimes useful for connecting box 910 to framing.

In use, the various modules are installed in place of traditional circuit breaker panels, junction boxes, and wall boxes. These can be wired in traditionally or can connect to the breaker panel using cabling that also contains the specialized connectors described above. Once installed, a homeowner can change modules out without any electrical knowledge and with NO exposure to bare electrical wires. For instance, a switch plate such as shown in FIG. 1B could be slid out or otherwise removed from modular wall box 205 and exchanged with the outlet assembly show in FIG. 1A. And at no time would the homeowner risk exposure to electrical shock. Perhaps thousands of different outlet arrangements are regularly sold to contractors and do-it-yourselfers. Most if not all these arrangements are suitable for being manufactured with the features described in this disclosure. Such modifications would allow any of these configurations to be chosen by a homeowner and switched into the home's power system with complete safety.

Moreover, this type of equipment is well known to be available in thousands of colors and finishes and styles. Manufacturing these different colors, finishes, and styles, with the modularity provided in this disclosure opens up a huge selection for homeowner modification. Thus, changing styles or room colors could be augmented by matching the style or color of the electrical outlet to the new room design.

For instance, companies could produce kits of outlets themed for various holidays or occasions and the homeowner could customize the appearance of their outlets based on the season or occasion.

For circuit break boxes with universal connectors, not shown, special power connectors can be used to run to street power hookup. The circuit break box may include a plurality of connection points.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

While particular exemplars of the present invention have been shown and described, it will be obvious to those skilled in the art that changes and modifications can be made without departing from the exemplars of this invention in its broader aspects and, therefore, the appended claims are to encompass within their scope all such changes and modifications as fall within the true, intended, explained, disclose, and understood scope and spirit of this invention's many exemplars and alternative descriptions.

Additionally, various exemplars have been described above. For convenience's sake, combinations of aspects composing invention exemplars have been listed so that one of ordinary skill in the art may read them exclusive of each other when they are not necessarily intended to be exclusive. But a recitation of an aspect for one exemplar is meant to disclose its use in all exemplars in which that aspect can be incorporated without undue experimentation. Likewise, a recitation of an aspect as composing part of an exemplar is a tacit recognition that a supplementary exemplar excludes that aspect explicitly. All patents, test procedures, and other documents cited in this specification are fully incorporated by reference to the extent that this material is consistent with this specification and for all jurisdictions in which such incorporation is permitted.

Moreover, some exemplars recite ranges. When this is done, it is meant to disclose the ranges as a range and disclose each point within the range, including endpoints. For those exemplars that disclose a specific value or condition for an aspect, supplementary exemplars exist that are otherwise identical but that specifically exclude the value or the conditions for the aspect.

What is claimed is:

1. A modular electrical box system comprising:
    a wall box configured to be mounted to a facility, the wall box including:
        a planar surface including a first electrical connector configured to engage an electrical connection of the facility; and
        a recessed portion configured to receive an interchangeable insert, the recessed portion including a second electrical connector; and
    an interchangeable insert removably connectable to the recessed portion of the wall box, wherein the interchangeable insert includes a third electrical connector configured to be coupled to the second electrical connector of the wall box, wherein the third electrical connector is disposed in the second electrical connector or the second electrical connector is disposed in the third electrical connector, and wherein the wall box is configured to supply power from the electrical connection of the facility to the interchangeable insert upon the third electrical connector being coupled to the second electrical connector.

2. The modular electrical box system of claim 1, wherein the second electrical connector comprises an extending contact and an extending face.

3. The modular electrical box system of claim 1, wherein the second electrical connector comprises a receding contact and an extending face.

4. The modular electrical box system of claim 1, wherein the second electrical connector comprises an extending contact and a receding face.

5. The modular electrical box system of claim 1, wherein the second electrical connector comprises a receding contact and a receding face.

6. The modular electrical box system of claim 1, wherein the third electrical connector comprises an extending contact and an extending face.

7. The modular electrical box system of claim 1, wherein the third electrical connector comprises a receding contact and an extending face.

8. The modular electrical box system of claim 1, wherein the third electrical connector comprises an extending contact and a receding face.

9. The modular electrical box system of claim 1, wherein the third electrical connector comprises a receding contact and a receding face.

10. The modular electrical box system of claim 1, wherein the interchangeable insert comprises an outlet assembly.

11. The modular electrical box system of claim 1, wherein the interchangeable insert comprises a switch plate.

12. The modular electrical box system of claim 1, wherein the interchangeable insert comprises a dimmer.

13. The modular electrical box system of claim 1, wherein the interchangeable insert includes a clip positioned at one end of the interchangeable insert, and wherein the clip is configured to engage a groove of the wall box to mechanically connect the interchangeable insert to the wall box.

14. The modular electrical box system of claim 1, further comprising:
a junction box including one or more electrical connectors disposed on each of one or more surfaces of the junction box, wherein junction box is configured to extend the electrical connection of the facility to one or more wall boxes.

15. The modular electrical box system of claim 14, wherein the junction box includes a mount extending from the junction box, wherein the mount is configured for use in connecting the junction box to a framing of the facility.

16. The modular electrical box system of claim 1, wherein the third electrical connector extends from a surface of the interchangeable insert and includes extending contacts configured to electrically engage receiving contacts of the second electrical connector.

17. A method comprising:
providing a modular electrical box system comprising:
a wall box configured to be mounted to a facility, the wall box including:
a planar surface including a first electrical connector configured to engage an electrical connection of the facility; and
a recessed portion configured to receive an interchangeable insert,
the recessed portion including a second electrical connector; and
an interchangeable insert that is removably connected to the recessed portion of the wall box, wherein the interchangeable insert includes a third electrical connector configured to be coupled to the second electrical connector of the wall box, wherein the third electrical connector is disposed in the second electrical connector or the second electrical connector is disposed in the third electrical connector, and wherein the wall box is configured to supply power from the electrical connection of the facility to the interchangeable insert upon the third electrical connector being coupled to the second electrical connector through a connection.

18. The method of claim 17, further comprising:
removing the interchangeable insert from the wall box and replacing the interchangeable insert with a second interchangeable insert.

19. The method of claim 18, wherein the interchangeable insert comprises an outlet assembly and the second interchangeable insert comprises a switch plate.

* * * * *